US 8,597,374 B2

(12) United States Patent
May

(10) Patent No.: US 8,597,374 B2
(45) Date of Patent: Dec. 3, 2013

(54) COMPOSITIONS FOR SPRAY DYEING OF CELLULOSIC FABRICS

(75) Inventor: Ruth E. May, Schuylkill Haven, PA (US)

(73) Assignee: HBI Branded Apparel Enterprises, LLC, Winston-Salem, NC (US)

( * ) Notice: Subject to any disclaimer, the term of this patent is extended or adjusted under 35 U.S.C. 154(b) by 0 days.

(21) Appl. No.: 13/079,479

(22) Filed: Apr. 4, 2011

(65) Prior Publication Data

US 2011/0179589 A1 Jul. 28, 2011

Related U.S. Application Data

(60) Division of application No. 12/329,684, filed on Dec. 8, 2008, now Pat. No. 7,931,699, which is a continuation-in-part of application No. 11/656,769, filed on Jan. 23, 2007, now Pat. No. 7,931,700, which is a continuation-in-part of application No. 11/338,346, filed on Jan. 24, 2006, now Pat. No. 7,931,701, which is a continuation-in-part of application No. 10/601,820, filed on Jun. 23, 2003, now Pat. No. 7,033,403, which is a continuation of application No. 10/386,161, filed on Mar. 10, 2003, now abandoned, which is a continuation-in-part of application No. 10/330,922, filed on Dec. 27, 2002, now Pat. No. 6,835,258.

(51) Int. Cl.
*C09B 62/00* (2006.01)
*D06P 5/00* (2006.01)

(52) U.S. Cl.
USPC .......... 8/543; 8/115.6; 8/116.1; 8/499; 8/552; 8/558; 8/587; 8/904; 8/907; 8/908; 8/918

(58) Field of Classification Search
USPC ............. 8/543, 529, 532, 533, 584, 918, 921, 8/115.6, 116.1, 499.543, 552, 558, 587, 8/904, 907, 908; 38/144; 252/8.91, 8.61; 427/370, 393.2
See application file for complete search history.

(56) References Cited

U.S. PATENT DOCUMENTS

| 1,796,039 A | 3/1931 | Pieter |
| 2,532,471 A | 12/1950 | Wedler |
| 2,915,230 A | 12/1959 | Brewin et al. |
| 2,974,838 A | 3/1961 | Parham |
| 2,985,502 A | 5/1961 | Kronsbein et al. |
| 2,990,087 A | 6/1961 | Brewin et al. |
| 2,990,088 A | 6/1961 | Isken et al. |
| 3,022,926 A | 2/1962 | Bailey, Jr. |
| 3,142,423 A | 7/1964 | Carter |
| 3,181,749 A | 5/1965 | Helliwell et al. |
| 3,357,611 A | 12/1967 | Berger et al. |
| 3,379,715 A | 4/1968 | Chiddix et al. |
| 3,468,539 A | 9/1969 | Swindall |
| 3,507,423 A | 4/1970 | Swindall |
| 3,653,562 A | 4/1972 | Kronsbein |
| 3,892,342 A | 7/1975 | Ogawa et al. |
| 3,969,074 A | 7/1976 | Chung |
| 3,973,902 A | 8/1976 | Zimmermann et al. |
| 4,033,943 A * | 7/1977 | Ramanathan et al. ........ 534/635 |
| 4,082,504 A | 4/1978 | Von Der Eltz |
| 4,110,117 A | 8/1978 | McLeod |
| 4,183,233 A | 1/1980 | Brown |
| 4,197,087 A | 4/1980 | Ami et al. |
| 4,324,117 A | 4/1982 | Schwob et al. |
| 4,345,907 A | 8/1982 | Wegele et al. |
| 4,359,322 A | 11/1982 | Neal et al. |
| 4,361,019 A | 11/1982 | Maund |
| 4,415,333 A | 11/1983 | Schlafer et al. |
| 4,483,032 A | 11/1984 | Christ et al. |
| 4,501,038 A | 2/1985 | Otting |
| 4,612,016 A | 9/1986 | Jaeger et al. |
| 4,648,250 A | 3/1987 | Yabe |
| 4,659,333 A | 4/1987 | Schaub |
| 4,676,078 A | 6/1987 | Ramsey |
| 4,717,391 A | 1/1988 | Daniel et al. |
| 4,786,288 A | 11/1988 | Handa et al. |
| 4,786,721 A | 11/1988 | Tzikas et al. |
| 4,792,619 A | 12/1988 | Berendt et al. |
| 4,793,014 A | 12/1988 | Luigi |
| 5,000,756 A * | 3/1991 | Aeschlimann .................... 8/549 |
| 5,010,612 A | 4/1991 | Jensen et al. |

(Continued)

FOREIGN PATENT DOCUMENTS

DE 19633101 2/1998
EP 1233098 A1 8/2002

(Continued)

OTHER PUBLICATIONS

Milliken & Company; http://www.millikencarpet.com/Millitron.html; "Milliken Millitron Injection Dye Technology"; 1998.

(Continued)

*Primary Examiner* — Bijan Ahvazi
(74) *Attorney, Agent, or Firm* — Womble Carlyle Sandridge & Rice LLP

(57) ABSTRACT

Compositions are provided for spray dyeing of a cellulosic, such as cotton, fabric or garment. The compositions include a reactive dye, a wetter, an alkali, and water. The present compositions are made by first mixing the reactive dye, the wetter, and the water to form a solution, and thereafter adding the alkali to the solution.

8 Claims, No Drawings

(56) References Cited

U.S. PATENT DOCUMENTS

| | | | |
|---|---|---|---|
| 5,016,308 A | 5/1991 | McBride et al. |
| 5,040,475 A | 8/1991 | Fournier et al. |
| 5,081,731 A | 1/1992 | Yamakita et al. |
| 5,165,355 A | 11/1992 | Fournier et al. |
| 5,205,305 A | 4/1993 | Yamakita |
| 5,288,322 A | 2/1994 | Hanna et al. |
| 5,393,360 A | 2/1995 | Bridges et al. |
| 5,458,265 A | 10/1995 | Hester et al. |
| 5,509,985 A | 4/1996 | Kock |
| 5,512,062 A | 4/1996 | Fuller et al. |
| 5,516,392 A | 5/1996 | Bridges et al. |
| 5,518,566 A | 5/1996 | Bridges et al. |
| 5,593,072 A | 1/1997 | Hester et al. |
| 5,713,223 A | 2/1998 | Lin |
| 5,775,136 A | 7/1998 | Chao-Cheng |
| 5,840,084 A * | 11/1998 | Bella et al. ............ 8/549 |
| 5,850,651 A | 12/1998 | Ishimaru et al. |
| 5,938,796 A * | 8/1999 | Negri et al. ............ 8/543 |
| 5,951,717 A | 9/1999 | Mrotzeck et al. |
| 5,960,650 A | 10/1999 | Chi-Lung |
| 5,964,407 A | 10/1999 | Sandkleiva |
| 6,019,799 A | 2/2000 | Brown et al. |
| 6,063,137 A | 5/2000 | Scheibli et al. |
| 6,120,560 A | 9/2000 | Miller et al. |
| 6,178,781 B1 | 1/2001 | Myers |
| 6,192,521 B1 | 2/2001 | Alberts et al. |
| 6,312,523 B1 | 11/2001 | Caldwell et al. |
| 6,393,871 B1 | 5/2002 | Chiang |
| 6,443,569 B1 | 9/2002 | Mheidle et al. |
| 6,464,811 B1 | 10/2002 | Meier et al. |
| 6,471,729 B1 | 10/2002 | Voth et al. |
| 6,495,058 B1 * | 12/2002 | Frankenbach et al. ....... 252/8.91 |
| 6,505,486 B1 | 1/2003 | Chang |
| 6,552,175 B2 | 4/2003 | Schmiedl et al. |
| 6,613,103 B2 | 9/2003 | Immediato et al. |
| 6,662,601 B2 | 12/2003 | Chang |
| 6,797,016 B1 | 9/2004 | Schofberger et al. |
| 6,835,258 B2 | 12/2004 | Bingham et al. |
| 7,033,403 B2 | 4/2006 | Bentham |
| 7,087,730 B2 | 8/2006 | Tzikas et al. |
| 7,144,431 B2 | 12/2006 | Gardner et al. |
| 7,214,633 B2 | 5/2007 | Sun et al. |
| 7,799,097 B2 | 9/2010 | Abbott et al. |
| 7,931,699 B2 | 4/2011 | May |
| 7,931,700 B2 | 4/2011 | May et al. |
| 7,931,701 B2 | 4/2011 | May et al. |
| 2002/0138922 A1 | 10/2002 | Schmiedl et al. |
| 2003/0041387 A1 | 3/2003 | Xu et al. |
| 2003/0097721 A1 | 5/2003 | Schmiedl et al. |
| 2003/0110573 A1 | 6/2003 | Gardner et al. |
| 2003/0135939 A1 | 7/2003 | Sun et al. |
| 2003/0154556 A1 | 8/2003 | Del Duca et al. |
| 2004/0034938 A1 | 2/2004 | Rohwer et al. |
| 2004/0123405 A1 | 7/2004 | Bentham |
| 2005/0241080 A1 | 11/2005 | Tzikas et al. |
| 2007/0002058 A1 | 1/2007 | Wittebrood |
| 2011/0179588 A1 * | 7/2011 | May et al. ............ 8/499 |

FOREIGN PATENT DOCUMENTS

| | | |
|---|---|---|
| EP | 1275700 A2 | 1/2003 |
| GB | 2265077 A | 9/1993 |
| IT | PD2001A000089 A1 | 10/2002 |
| WO | WO-8606425 A1 | 11/1986 |
| WO | WO-96/28604 | 9/1996 |
| WO | WO-2004-081118 | 9/2004 |
| WO | WO-2006/105365 A2 | 10/2006 |
| WO | WO-2007087407 | 8/2007 |

OTHER PUBLICATIONS

"Ciba Specialty Chemicals Sets New Wet Fastness Standard with Innovative Range of Carpet Dyes." www.cibasc.com/textile effects, Jun. 24, 2002.

"Spray Dyeing on Cotton and Wool Fabrics," International Dyer, Dyeing Cotton & Cellulosics, date unknown, available as of filing date.

European Patent Office, European Examination Report for EP 07762393.2 , dated Jul. 16, 2009.

US Patent Office, Official Action for U.S. Appl. No. 12/371,812 dated Mar. 29, 2011.

Regarding related patents and patent applications, see the section of the accompanying IDS letter entitled "Related Patents and Patent Applications" for further information, dated Jul. 11, 2011,

* cited by examiner

COMPOSITIONS FOR SPRAY DYEING OF CELLULOSIC FABRICS

RELATED APPLICATIONS

This application is a divisional of U.S. application Ser. No. 12/329,684, filed Dec. 8, 2008 now U.S. Pat. No. 7,931,699, which is a continuation-in-part of U.S. application Ser. No. 11/656,769, filed Jan. 23, 2007 now U.S. Pat. No. 7,931,700, which is a continuation-in-part of U.S. application Ser. No. 11/338,346, filed Jan. 24, 2006 now U.S. Pat. No. 7,931,701, which is a continuation-in-part of U.S. application Ser. No. 10/601,820, filed Jun. 23, 2003, now U.S. Pat. No. 7,033,403, which is a continuation of Ser. No. 10/386,161, filed on Mar. 10, 2003, now abandoned, which is a continuation-in-part of U.S. application Ser. No. 10/330,922, filed Dec. 27, 2002, now U.S. Pat. No. 6,835,258. All of these applications are herein incorporated by reference.

FIELD OF THE INVENTION

The present invention relates to the dyeing of cellulosic fabrics. More particularly, the present invention relates to compositions for uniformly applying, preferably by spraying, a dye on both surfaces or sides of a cellulosic fabric.

BACKGROUND OF THE INVENTION

Today, fabrics are made from a wide variety of natural fibers, such as cotton, synthetics, and combinations thereof. The basic fabric is a greige fabric that must be dyed in order to provide the desired color to the resultant fabric and/or garment. Many dye compositions and methods have been proposed for dyeing fabrics; however, most have proven costly in terms of materials, labor, and processing time.

One conventional dyeing method, known as yarn dyeing, involves dyeing individual fibers or yarns prior to the fibers or yarns being sewn, knitted, or woven into a fabric. A significant problem associated with this method is the substantial inventory requirement to maintain a supply of the various colored yarns needed to produce textile products, and the prohibitively high inventory costs resulting therefrom.

Another conventional dyeing method is known as bulk dyeing. In bulk dyeing, un-dyed fibers or yarns are knitted or woven into a raw, or undyed, fabric. The raw fabric is subsequently scoured or bleached, and then dyed.

Common bulk dyeing methods include vat dyeing, beam dyeing, jet dyeing, and bath dyeing. Vat dyeing typically consists of immersing a piece of fabric in a vat of liquid dye. Beam dyeing involves winding a length of fabric about a perforated beam. The beam is then placed in a vessel where dye is pumped into the center of the beam, out of the perforations, and through the fabric. Jet dyeing involves placing the fabric in a high-pressure, high-temperature kettle of liquid dye. Bath dyeing involves immersing the fabric in a bath of dye in a rotating drum.

There are a number of problems, however, associated with bulk dyeing methods. First, the bulk dyeing process necessitates large volumes of water, which increases the costs of the bulk dyed fabrics, and has an adverse impact on the environment. Also, some of the dyed fabric must be cut away from templates during the manufacture of a garment from the fabric. Since the bulk fabric has already been dyed, this results in increased costs due to the wasted dye and fabric.

A more significant problem with bulk dyed fabrics in the manufacture of garments is the unpredictability of consumer color preferences. In the garment industry, changes in consumers' preferences for one color over another color can lead to an overstock of the undesired colored garments and a back-order of the desired colored garments.

Other methods of dyeing fabrics involve printing dyes onto a surface of a fabric. These methods are commonly used to apply a decorative pattern on the surface of the fabric. Such printing methods include screen-printing and inkjet printing. While these methods have proven useful in quickly changing from one decorative pattern to another, they have not proven useful for large scale production of fabrics or garments.

Perhaps one of the most cost-effective methods of dyeing a fabric is spray dyeing. Spray dyeing, as used herein, includes conventional spraying as well as atomization and electrostatic applications. However, a problem with spray dyeing is providing a uniform dye on both sides of the fabric. Normally, to achieve such uniformity requires spray dyeing on both sides of the fabric or garment in a very controlled environment. Also, the fabric or garment must remain in a taut position in order to provide a flat and even distribution of color on the fabric or garment. This is difficult to achieve in large scale production, and not cost-effective, especially if both sides of the fabric or garment are to be dyed.

Accordingly, there is a need for a dye composition and resultant method of dyeing cellulosic, such as cotton, greige, scoured, or bleached fabrics that provide uniform color on both sides of the fabric. It is particularly important to provide such a composition that will dye cellulosic fabrics to any desired color in one basic spray step or operation.

SUMMARY OF THE INVENTION

The present invention provides a composition that permits uniform spray dyeing of a cellulosic fabric or garment, so that both sides of the fabric or garment have the same uniform color, and so that a more uniform dyeing throughout the fabric or garment is achieved.

These and other advantages and benefits of the present invention are provided by a composition that is anionic or nonionic. The composition includes a reactive dye, a wetter, an alkali, and water. In other embodiments of the present invention, the composition may include one or more of the following: a chelator, a dye leveling agent, an anti-reducing agent, and/or a defoamer.

The present invention also provides a method for making the present compositions that includes first mixing together the wetter, chelator (if used), dye and water to form a solution in which the dye is well dissolved or blended. In one embodiment, the alkali is, within thirty minutes before application of the solution to the fabric, merged into the solution, or independently applied, preferably by spraying, along with the solution, onto the fabric.

The above-described and other advantages and features of the present disclosure will be appreciated and understood by those skilled in the art from the following detailed description and appended claims.

DETAILED DESCRIPTION

The present invention provides compositions that may be applied to a fabric or garment made of a cellulosic material. The compositions provide uniform color throughout the fabric, namely on both sides or surfaces of the fabric, as well as throughout the fabric.

The term cellulosic, as used herein, refers to both natural and synthetic materials, such as cotton and rayon. The cellulosic material may be greige, scoured or bleached, or any combinations thereof.

A reactive dye is used in the present compositions. A reactive dye is a dye that reacts with fibers in the fabric or garment to form a covalent bond. The dyes can be any chemistry type for cold to mid-temperature reactive dyes.

The reactive dye included in the compositions described herein comprises an amount between about 10 grams per liter (g/l) and 80 g/l of the composition. The precise dye is based on the color value and depth of color desired. For example, in one color spectrum, a pink color would require between about 10 g/l and 20 g/l dye of the composition. If the desired color is royal blue, the dye would be between about 40 g/l and 60 g/l of the composition.

The compositions described herein include a reactive dye, a wetter or wetting agent, an alkali, and water. In addition, the compositions may include one or more of the following: a chelator, a dye leveling agent, a defoamer, and/or an anti-reducing agent. In another embodiment, the compositions may include a reactive dye, a wetter, and water. In the present compositions, each ingredient is anionic or nonionic.

The wetter of the present compositions acts to transport the dye into the fabric, thereby assisting in locking the color into the fabric. The wetter is a blend of one or more surfactants. The surfactants provide detergent properties to the fabric and are either anionic or nonionic. It is believed that any anionic or nonionic surfactant can be used. The preferred wetter or blend of surfactants contains sulfuric acid disodium salt, phosphoric acid, and a trisodium salt. In another embodiment, the wetter may be sodium dioctyl sulfosuccinate.

The wetter comprises an amount between about 5 g/l and 40 g/l of the composition. In one embodiment, the wetter comprises an amount between about 5 g/l and 20 g/l.

The embodiments of the compositions described herein each comprise an alkali. The alkali should have a pH of between about 10.0 and 11.0. The alkali typically is a liquid and comprises a combination of soda ash, potassium carbonate and phosphate.

Alternatively, in one embodiment, the alkali may be a combination of a silicate, such as a sodium silicate, and a caustic if the fabric is a greige fabric, or only a caustic, such as soda ash, if the fabric is a scoured or bleached fabric. The caustic may be sodium hydroxide, sodium carbonate, or soda ash. The sodium silicate assists in bleaching the cellulosic fabric, and acts to stabilize the composition.

For bright and light colors, the sodium silicate and caustic are included in about a 2 to 1 ratio. Thus, 2 parts sodium silicate requires 1 part caustic.

The alkali comprises an amount between about 3 g/l and 20 g/l of the composition. In one embodiment, the alkali comprises an amount between about 5 g/l and 15 g/l. For deep colors, the alkali comprises about 10 g/l of the composition.

One significant benefit is the greatly reduced amount of water in the present compositions. Whereas the conventional dye compositions described above comprise a liquid ratio of 6 parts water to 1 part of the remaining liquid volume, the present compositions comprise a liquid ratio of about 1 part water to 6 parts of the remaining liquid volume.

Optionally, the present compositions may include one or more additional constituents. One such optional ingredient is a chelator. The chelator is, like all other ingredients of the present compositions, an anionic or a nonionic ingredient. The chelator is a stable to high alkali, is used to remove hard metals from the water, and prevents precipitation of chemicals that leads to unevenness of the color. The chelator also assists in stabilizing the dye bath. Thus, a chelator may not be needed in the present compositions if minerals, such as hard metals, are not present in the fabric or garment, or in the water source. Chelators that may be used in the present compositions include, but are not limited to, a blend of amino acid derivatives or pentasodium salt of diethlenetriaminepenta acetic acid.

When present, the chelator comprises an amount between about 1 g/l and 40 of the composition. In one embodiment, the chelator comprises an amount between about 1 g/l and 20 g/l, and optimally about 6 g/l. The amount necessary is dependent upon the quantity of metals and minerals in the composition and/or fabric.

An optional dye leveling agent is used to provide uniformity for the dye in the compositions. Thus, if the desired uniformity is achieved by the composition itself alone, or in combination with the spray method used, the dye leveling agent may not be needed. Where a wetter is included in the composition, the dye leveling agent may not be necessary.

The present compositions optionally also may include a defoamer. The defoamer acts to eliminate any non-aerated liquid. Defoamers that may be used in the present compositions include, but are not limited to, a petroleum distillate blend, organosilicone, petroleum distillate, hydrocarbon, or reacted silicone. The defoamer comprises an amount between about 0.1% g/l and 0.5% of the composition.

Lastly, the compositions optionally may include an anti-reducing agent to prevent reduction of the dyestuff during fixation, thus improving color stability. The amount of anti-reducing agent included in the compositions is dependent upon the particular application.

The present compositions may be formulated and applied according to the following method in order to enhance the efficacy of the composition. The dye, wetter, chelator (if included), and water are mixed together to for a solution with the dye well dissolved or blended therein. Thereafter, the alkali may be mixed into the solution. Alternatively, the alkali can be independently merged or mixed at the spray head with the solution. Within about thirty (30) minutes after the alkali is mixed into or merged with the solution, the composition should be applied to the cellulosic fabric before the dye molecules begin to hydrolyze.

Alternatively, the constituents of the composition may be mixed simultaneously in an in-line spray head. For example, each constituent moves to a sleeve or manifold having a mixer, such as a corkscrew, therein to mix together the constituents before entering the spray head.

Following mixing, the composition is sprayed on the surfaces or sides of a fabric using one or more spray nozzles. The manifold and spray nozzles may be fixed in position as the fabric is moved beneath or above them. Alternatively, the spray nozzles may be movable with respect to each surface or side of the fabric so that a substantially even coat of the composition is applied to the surfaces of fabric. One method of spray dyeing is disclosed in U.S. Pat. No. 7,033,403, which is incorporated herein by reference.

The amount of the composition that actually affixes to the fabric is based on the total amount of wet pickup. Wet pickup is calculated after the composition is sprayed onto the fabric. A cut of the sprayed, wet fabric is weighed, followed by rinsing of the cut piece with water to remove all of the sprayed composition possible. The cut piece is then dried and weighed. The weight of the wet sprayed cut piece minus the dry weight of the cut piece, divided by the weight of the sprayed cut piece, yields the wet pickup of the fabric. A wet pickup of between about 60 percent and 90 percent has been found to be optimal. The wet pickup percentage also is dependent upon the depth of color, wherein darker colors require a higher percentage than lighter colors.

Advantageously, the composition may be applied by spraying onto the two surfaces or sides of the fabric for between about one (1) and twenty (20) seconds, and optimally between about five (5) seconds and twenty (20) seconds. The total spraying time also is dependent upon the width of the fabric.

Depending upon the particular dyeing operation, differing numbers of spray nozzles and spray nozzle orientations may be utilized. Also, the size of the head of a spray nozzle may vary. The spray nozzle size also is dependent upon the desired wet pickup and the width of the fabric.

As mentioned above, another benefit of the composition of the present invention is the reduction in water and dye consumption compared to the known methods of dyeing, since the composition applied directly to the surfaces of the fabric penetrates more easily and readily than any known composition. Another benefit achieved by the use of the present compositions is that one can effectively and efficiently dye small runs of fabrics to a desired color.

While the present invention has been described with reference to one or more exemplary embodiments, it will be understood by those skilled in the art that various changes may be made and equivalents may be substituted for elements thereof without departing from the scope of the present invention. In addition, many modifications may be made to adapt a particular situation or material to the teachings of the present invention without departing from the scope thereof. Therefore, it is intended that the present invention not be limited to the particular embodiment(s) disclosed as the best mode contemplated for carrying out this invention, but that this invention will include all embodiments falling within the scope of the appended claims.

The invention claimed is:

1. A method of making a composition for spray application onto surfaces of a cotton fabric, consisting of: mixing together a reactive dye, a wetter, and water to form a solution, the wetter being selected from the group consisting of a first surfactant, wherein the first surfactant is a blend of sulfuric acid disodium salt and phosphoric acid trisodium salt, and a second surfactant, wherein the second surfactant is sodium dioctyle sulfosuccinate; and adding an alkali to the solution to complete the composition at a time that allows spray application of the solution onto the surfaces of a cotton fabric before the dye hydrolyzes, the alkali being selected from the group consisting of a first combination of soda ash, potassium carbonate and phosphate, and a second combination of sodium silicate and a caustic.

2. The method of claim 1, wherein the wetter, the reactive dye, and the alkali are anionic or non-ionic.

3. The method of claim 1, wherein the wetter comprises an amount between 5 g/l and 40 g/l.

4. The method of claim 1, wherein the reactive dye is an azo metal complex or dioxazine.

5. The method of claim 4, wherein the reactive dye comprises an amount between 10 g/l and 80 g/l.

6. The method of claim 1, wherein the alkali comprises an amount between 3 g/l and 20 g/l.

7. The method of claim 6, wherein the alkali has a pH between 10.0 and 11.0.

8. A method of making a composition for spray application onto surfaces of a cotton fabric consisting of: mixing together a reactive dye, a wetter, water and at least one of a chelator, a dye leveling agent, a defoamer, and an anti-reducing agent, to form a solution, the wetter being selected from the group consisting of a first surfactant, wherein the first surfactant is a blend of sulfuric acid disodium salt and phosphoric acid trisodium salt, and a second surfactant, wherein the second surfactant is sodium dioctyle sulfosuccinate; and adding an alkali to the solution to complete the composition at a time that allows spray application of the solution onto the surfaces of a cotton fabric before the dye hydrolyzes, the alkali being selected from the group consisting of a first combination of soda ash, potassium carbonate and phosphate, and a second combination of sodium silicate and a caustic.

* * * * *